June 4, 1929.　　　C. E. HENDERSON　　　1,716,312
APPARATUS FOR MAKING PLATE GLASS
Filed Feb. 20, 1928　　3 Sheets-Sheet 2
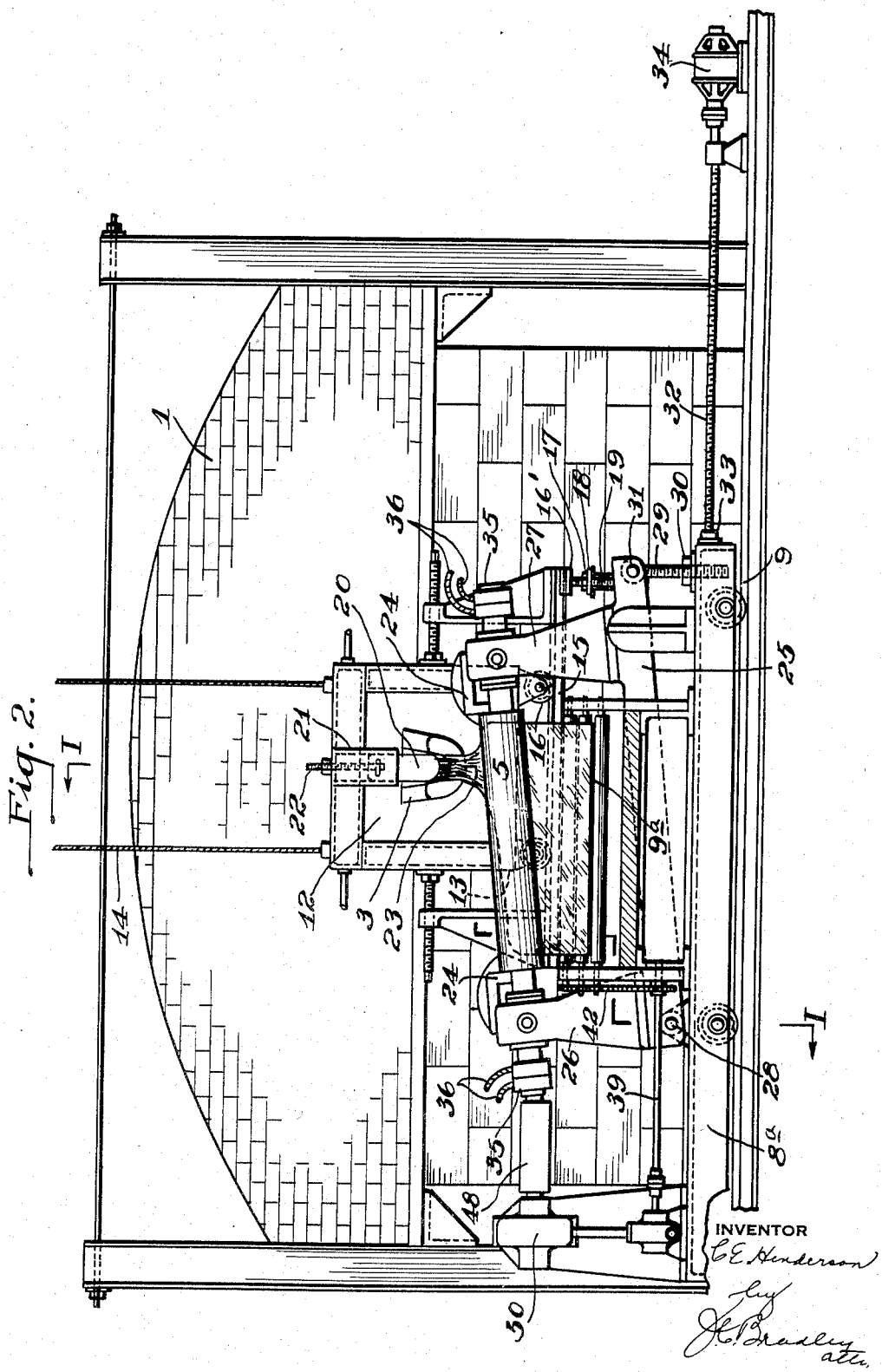
INVENTOR
C. E. Henderson
by
J. H. Bradley
atty.

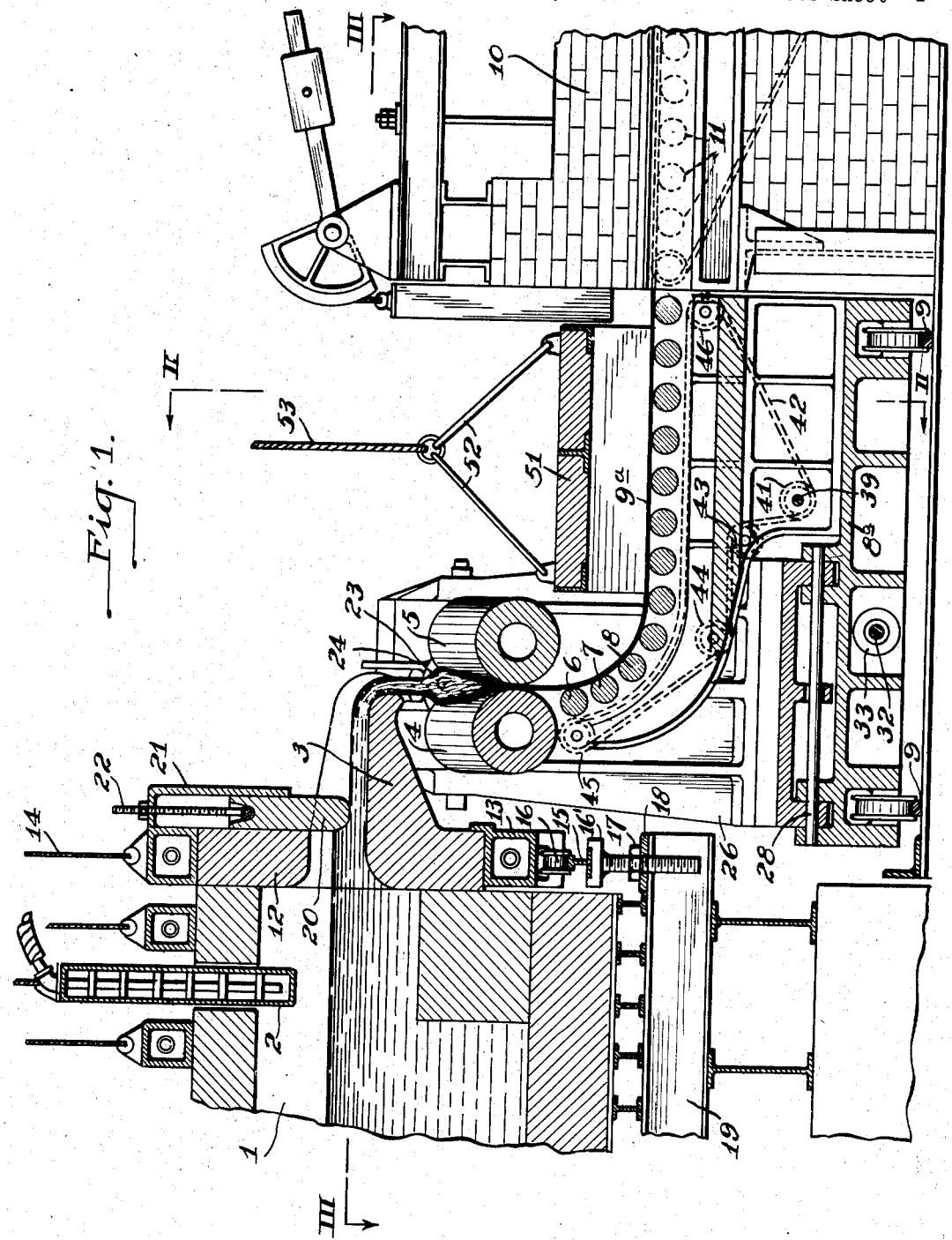

June 4, 1929.  C. E. HENDERSON  1,716,312
APPARATUS FOR MAKING PLATE GLASS
Filed Feb. 20, 1928  3 Sheets-Sheet 3
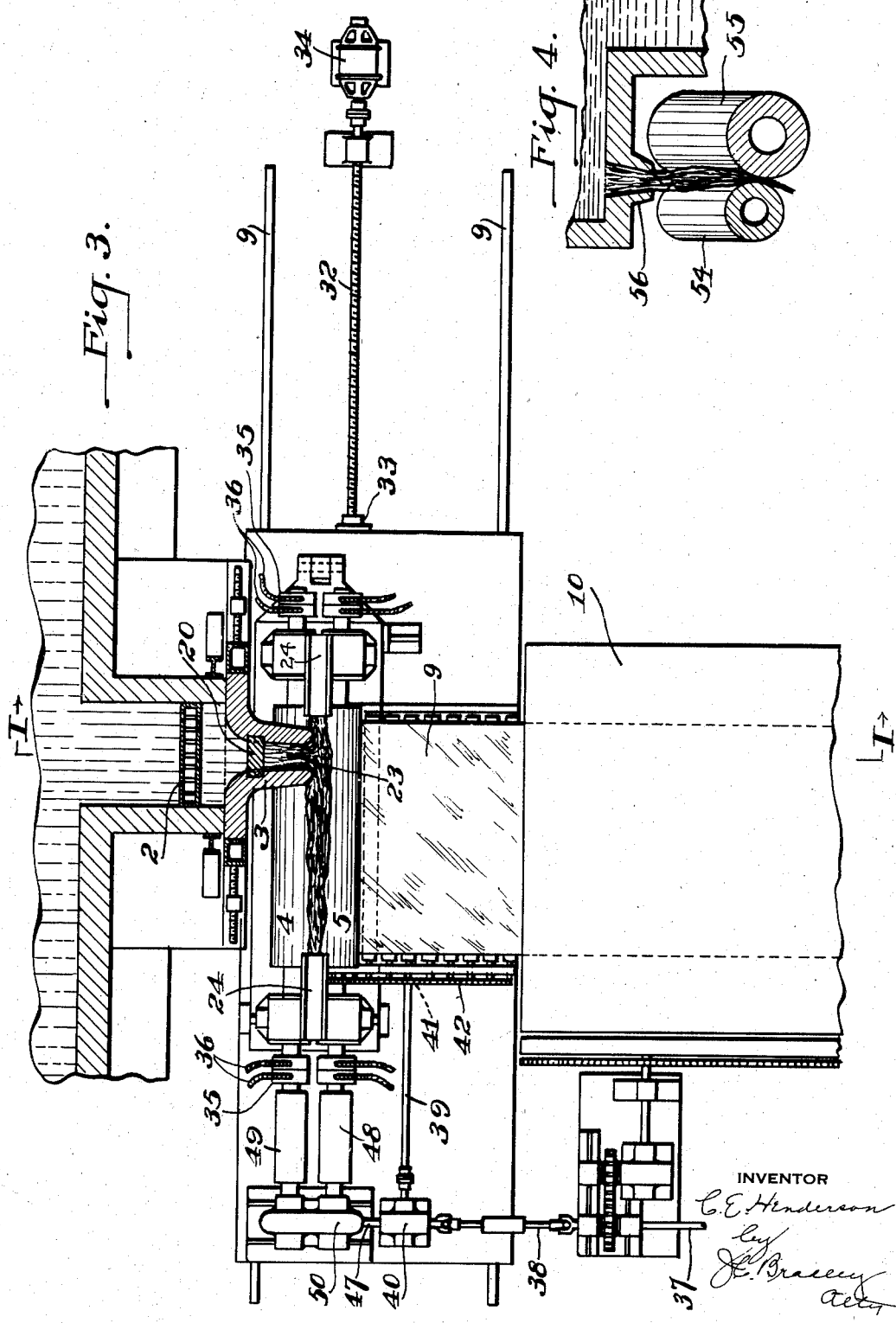

Patented June 4, 1929.

1,716,312

UNITED STATES PATENT OFFICE.

CHESTER E. HENDERSON, OF KOKOMO, INDIANA, ASSIGNOR TO PITTSBURGH PLATE GLASS COMPANY, A CORPORATION OF PENNSYLVANIA.

APPARATUS FOR MAKING PLATE GLASS.

Application filed February 20, 1928. Serial No. 255,564.

The invention relates to apparatus for making plate glass continuously from a tank by a rolling process. It has for its principal objects the provision of an improved apparatus for producing glass relatively free from ream, blister and other defects ordinarily present in continuously rolled sheets as heretofore produced. Certain embodiments of the invention are illustrated in the accompanying drawings, wherein:

Figure 1 is a vertical section on the line I—I of Fig. 3. Fig. 2 is a partial plan view and partial section taken on the line II—II of Fig. 1. Fig. 3 is a section on the line III—III of Fig. 1. And Fig. 4 is a diagrammatic sectional view showing a modification.

Referring to the drawings, 1 is the outlet end of a melting tank provided with the cut-off gate 2 and an outlet trough 3; 4 and 5 are sizing rolls in position to receive the glass discharged from the trough; 6, 7, 8, etc. are rolls constituting a runway for receiving the sheet 9ª which is formed between the sizing rolls; 8ª is a truck carrying the sizing rolls and runway and mounted upon the rails 9, 9; and 10 is a leer provided with the rolls 11 for receiving the continuously formed glass sheet.

The front wall 12 of the tank which carries the outlet trough 3 is carried in a hollow water cooled frame 13, which is positioned for convenient removal and replacement from an overhead crane provided with chains 14 for engaging suitable lugs carried by the frame 13. Extending transversely of the front of the tank is a rail 15 which carries the frame 13, such frame being provided with wheels 16 engaging the rails. This provides a means for the lateral adjustment of the trough 3 and the discharge from such trough upon the rolls. The rail 15 is mounted for vertical adjustment upon a series of screws 16' carrying the nut 17 engaging the top of the plate 18, such plate in turn being carried by the beams 19 constituting a part of the supporting framework of the tank. This arrangement provides for the vertical adjustment of the trough 3 so that the glass may be withdrawn from any desired elevation with respect to the level of the glass in the tank. The amount of flow through the trough 3 is regulated by the gate 20 which is movable up and down in the guide 21 by means of the screw 22.

As indicated in Figs. 1 and 2, the sizing rolls 4 and 5 are inclined to the horizontal and are positioned so that the discharge 23 from the trough flows into the recess between the rolls adjacent their upper ends. From this point, the mass of glass flows downward along the recess, thus providing a mass of glass of substantially the length of the finished sheet 9ª from which such sheet is rolled. In order to control the endwise movement of the mass of glass, suitable end members 24 and 24 (Figs. 2 and 3) are provided, such members being known in the art as "guns" and fitting down into the V-shaped recess between the rolls. In order to provide for the tilting of the rolls, they are journaled in a roll frame 25 having the standards 26 and 27 and pivoted to the truck 8 at 28 (Fig. 3). The other end of the frame 25 is raised and lowered by means of the screw 29, which has its lower end threaded through the nut 30 carried on the truck frame and has its upper end pivoted at 31 to the roll frame. In this manner, the inclination of the rolls may be varied to meet requirements. The truck may also be shifted laterally to vary the position of the discharge 23 upon the rolls by means of the screw 32 extending through a nut 33 in the truck frame and driven from the motor 34.

The rolls are water cooled, being provided at their ends with the swivels 35 connected with water circulating pipes 36. These sizing rolls and also the rolls 6, 7, 8, etc. constituting the apron or runway are driven from the line shaft 37, which also drives the leer rolls 11. This line shaft has an extension 38 which drives the countershaft 39 through the intermediary of suitable worm gearing in the casing 40. The line shaft 39 is provided with a sprocket wheel 41 (Fig. 1) around which passes the sprocket chain 42, such sprocket chain also passing over the idlers 43, 44, 45 and 46, which has its upper flight in engagement with suitable sprockets on the ends of the runway rolls 6, 7, 8, etc. The shaft 38 also has an extension 47 (Fig. 2) by means of which the tumbler shafts 48 and 49 are driven through the intermediary of suitable reducing gearing in the casing 50, such tumbler shafts being connected at their ends to the sizing rolls 4 and 5. In order to conserve the heat in the glass sheet as it passes over the runway, the cover 51 may be employed, such cover being supported from above by means of the rods 52 and the chain 53, suitably supported from above.

Fig. 4 illustrates in diagrammatic form a modification in which the sizing rolls 54 and 55 are located beneath an outlet slot 56, which is provided through the bottom of the tank, such outlet taking the place of the outlet trough 3 of the Fig. 1 construction. In other respects, this construction follows that of Figs. 1 to 3, the finished plate being carried away by a suitable apron or runway and lead through a roller leer. In this construction, however, as in the other, the glass discharges in a relatively thick stream to the recess at the upper ends of the rolls, and then flows downward along the recess so as to supply a body of the necessary length for producing a sheet having the requisite width.

What I claim is:

1. The combination with a glass melting tank having an outlet, of a pair of driven rolls beneath such outlet inclined to the horizontal in position to receive therebetween the flow of glass from said outlet adjacent the roll ends which are elevated above the level of the other ends.

2. The combination with a glass melting tank having an outlet, of a pair of driven sizing rolls arranged to receive between them adjacent their ends the flow from said outlet, and inclined downward toward their other ends, and a runway for receiving the sheet formed in the pass between the rolls, the said outlet having a width which is only a fraction of the width of the sheet produced and positioned to discharge at the upper ends of the rolls so that the mass of glass thus supplied between the rolls flows down the inclined recess to provide a mass corresponding approximately in length to the width of the finished sheet.

3. The combination with a glass melting tank having an outlet, of a pair of driven rolls beneath such outlet inclined to the horizontal in position to receive therebetween the flow of glass from said outlet adjacent the roll ends which are elevated above the level of the other ends and a runway beneath the pass through the rolls on the lower side thereof extending downwardly and laterally.

4. The combination with a glass melting tank having an outlet extending laterally from the tank, of a pair of driven sizing rolls located beneath the end of said outlet, such rolls being inclined to the horizontal and positioned off center with respect to said outlet so that the glass flowing downward from the outlet is received in to the recess or pocket between the rolls adjacent the upper end thereof.

5. The combination with a glass melting tank having an outlet, of a pair of driven rolls beneath such outlet inclined to the horizontal in position to receive therebetween the flow of glass from said outlet adjacent the roll ends which are elevated above the level of the other ends and means for varying the inclination of the rolls, the width of the body of glass discharged from the outlet having a width which is only a fraction of the width of the finished sheet.

6. The combination with a glass melting tank having an outlet, of a pair of driven rolls beneath such outlet inclined to the horizontal in position to receive therebetween the flow of glass from said outlet adjacent the roll ends which are elevated above the level of the other ends, and means for shifting the rolls endwise beneath the outlet, such outlet having a width which is only a fraction of the width of the finished sheet.

7. The combination with a glass melting tank having an outlet, of a pair of driven rolls beneath such outlet inclined to the horizontal in position to receive therebetween the flow of glass from said outlet adjacent the roll ends which are elevated above the level of the other ends, means for varying the inclination of the rolls, and means for shifting the rolls endwise beneath the outlet, such outlet having a width which is only a fraction of the width of the finished sheet.

8. The combination with a glass melting tank having an outlet, of a pair of driven rolls beneath such outlet inclined to the horizontal in position to receive therebetween the flow of glass from said outlet adjacent the roll ends which are elevated above the level of the other ends, and means for shifting the outlet laterally to vary the point of discharge with respect to the rolls, such outlet having a width which is only a fraction of the width of the finished sheet.

9. The combination with a glass melting tank having an outlet, of a pair of driven rolls beneath such outlet inclined to the horizontal in position to receive therebetween the flow of glass from said outlet adjacent the roll ends which are elevated above the level of the other ends, and means for shifting the outlet vertically, such outlet having a width which is only a fraction of the width of the finished sheet.

In testimony whereof, I have hereunto subscribed my name this tenth day of February, 1928.

CHESTER E. HENDERSON.